US008386961B2

(12) United States Patent
Buffet et al.

(10) Patent No.: US 8,386,961 B2
(45) Date of Patent: Feb. 26, 2013

(54) WIDGET OF GRAPHICAL USER INTERFACE AND METHOD FOR NAVIGATING AMONGST RELATED OBJECTS

(75) Inventors: Jean Buffet, Sartrouville (FR); Francois Perroux, Chaville (FR)

(73) Assignee: Dassault Systemes, Suresnes Cedex (FR)

( * ) Notice: Subject to any disclaimer, the term of this patent is extended or adjusted under 35 U.S.C. 154(b) by 1053 days.

(21) Appl. No.: 12/166,608

(22) Filed: Jul. 2, 2008

(65) Prior Publication Data

US 2009/0019397 A1 Jan. 15, 2009

(30) Foreign Application Priority Data

Jul. 6, 2007 (EP) ..................................... 07013290

(51) Int. Cl.
*G06F 13/00* (2006.01)
*G06F 15/00* (2006.01)
(52) U.S. Cl. ........................ 715/841; 715/825
(58) Field of Classification Search .......... 715/834–837, 715/745, 841, 825
See application file for complete search history.

(56) References Cited

U.S. PATENT DOCUMENTS

| | | | |
|---|---|---|---|
| 5,689,667 A | 11/1997 | Kurtenbach | |
| 5,701,424 A * | 12/1997 | Atkinson | 715/808 |
| 5,706,448 A * | 1/1998 | Blades | 715/834 |
| 6,285,367 B1 | 9/2001 | Abrams et al. | |
| 6,414,700 B1 | 7/2002 | Kurtenbach et al. | |
| 6,850,252 B1 * | 2/2005 | Hoffberg | 715/716 |
| 7,046,248 B1 * | 5/2006 | Perttunen | 345/440 |
| 7,418,670 B2 * | 8/2008 | Goldsmith | 715/810 |
| 7,793,226 B2 * | 9/2010 | Sorenson et al. | 715/777 |
| 7,941,765 B2 * | 5/2011 | Fleck et al. | 715/834 |
| 2002/0089541 A1 | 7/2002 | Orbanes et al. | |
| 2004/0100504 A1 | 5/2004 | Sommer | |
| 2004/0221243 A1 | 11/2004 | Twerdahl et al. | |
| 2005/0076309 A1 * | 4/2005 | Goldsmith | 715/811 |

FOREIGN PATENT DOCUMENTS

WO WO 2004/023283 A1 3/2004

OTHER PUBLICATIONS

Lyons, P.J., et al., "The Oval Menu—Evolution and Evaluation of a Widget," *Computer-Human Interaction, 1996, Proceedings Sixth Australian Conference on Hamilton*, New Zealand, pp. 24-27, (1996).

* cited by examiner

*Primary Examiner* — Cao "Kevin" Nguyen
(74) *Attorney, Agent, or Firm* — Hamilton, Brook, Smith & Reynolds, P.C.

(57) ABSTRACT

The invention is directed to a widget of or in a graphical user interface for navigating amongst related objects. The widget is adapted for displaying first and second groups of objects within respective first and second visually linked display areas. The widget is further adapted, upon user selection of a relation between an object of the second group and a third group of objects, for displaying objects of the third group in the second display area and objects of the second group in the first display area. The invention also relates to a method for navigating amongst related objects, comprising a step of providing to a user a graphical user interface with such a widget. Lastly, the invention is directed to a computer program comprising code means for implementing the method and to a computer system comprising means for implementing the method.

24 Claims, 8 Drawing Sheets

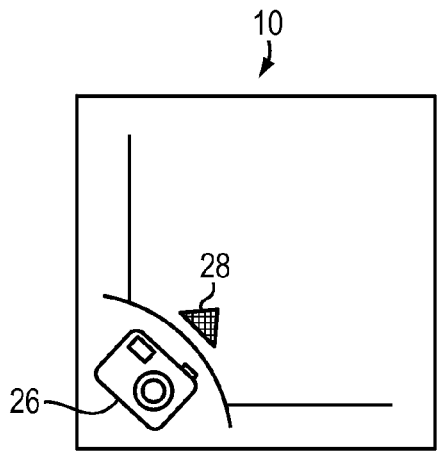
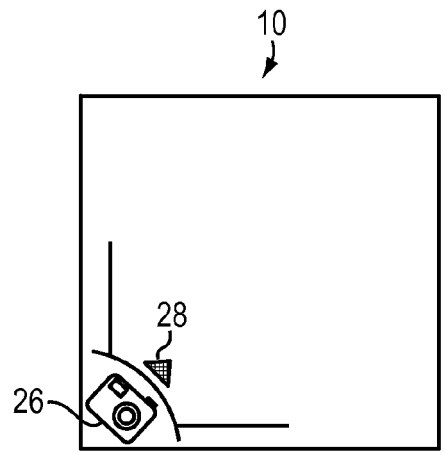
FIG. 12A    FIG. 12B
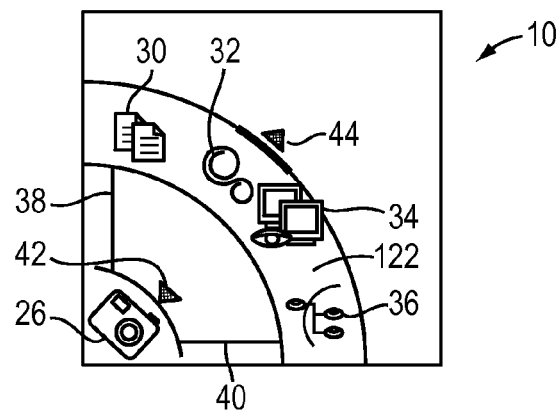
FIG. 12C
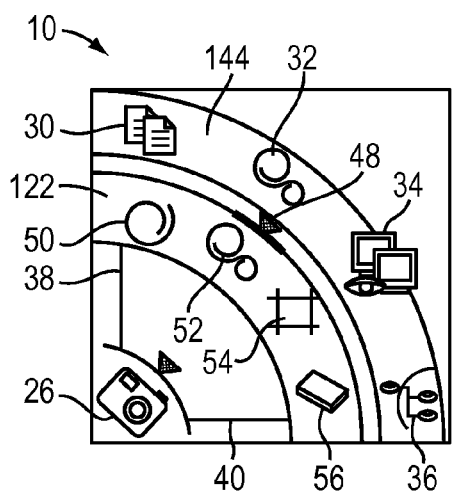
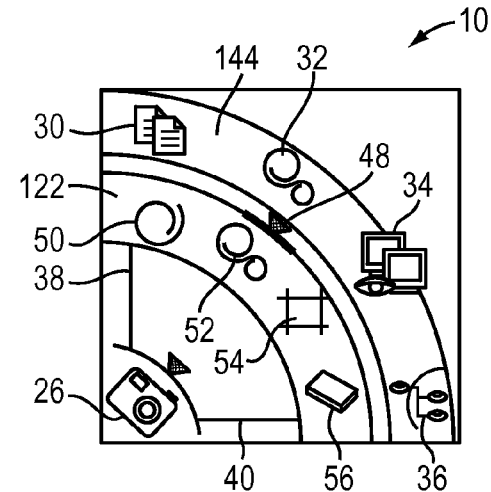
FIG. 12D    FIG. 12E

WIDGET OF GRAPHICAL USER INTERFACE AND METHOD FOR NAVIGATING AMONGST RELATED OBJECTS

RELATED APPLICATION(S)

This application claims priority under 35 U.S.C. §119 or 365 to European, Application No. EP 07013290.7, filed Jul. 6, 2007.

The entire teachings of the above application(s) are incorporated herein by reference.

FIELD OF INVENTION

The invention relates to the field of computers programs and systems and more specifically to a widget of graphical user interface (or GUI) for navigating amongst related objects. The invention also relates to a method for navigating amongst related objects, to a computer program comprising code means for implementing the method and to a computer system comprising means for implementing the method.

BACKGROUND OF THE INVENTION

For navigating amongst related objects computer users know a widget of graphical user interface—known as "menu bar"—which allows the users to have point-and-click access to specific functions, such as saving a file, copying text, or opening a help window.

A menu bar is a widget of graphical user interface which is well suited for navigating amongst related objects. Indeed, a menu bar is adapted for displaying groups of objects within respective visually linked display areas. Typically the display areas appear in a rectangular shape, under the menu bar. A menu bar is further adapted, upon user selection of a relation between an object of one group displayed in a previous display area and a further group of objects, for displaying objects of the further group in a further display area visually linked to the previous display area.

However designing widgets of GUI implies at least to pay attention to:
 screen encumbrance; that is, to minimize the size of the widget of GUI compared to the workspace on the computer screen, and to
 mouse displacement; that is, to minimize the movement of the hand to navigate amongst related object.

Since, in a classical menu bar, each further group of objects is displayed in a further display area shifted compared to the previous display areas, a menu bar navigation system may suffer from both screen encumbrance and great mouse displacements to navigate amongst the related objects.

It is also known from the man of the art a circular pop-up menu also known as "pie menu", or "radial menu", where selection depends on direction, a pie menu being made of several "pie slices". In this respect, FIGS. 1 and 2 show different examples of pie menus 11, 13.

To use a pie menu, a user usually activates the selection indicator of the pointing device—for example a pen—by pressing down on the screen with the pen during a short interval of time. The pie menu 11 then appears with its centre under the tip of the pen. The user can then highlight an object by keeping the pen pressed and making a stroke towards the desired object. If the object is not related to a group of objects but is related to a command, the command can be run by selecting the object. The object can be selected by lifting the pen. If the object is related to a group of objects and the user stops moving the pen, these objects may be displayed within a ring shaped pattern with its centre under the pen.

Accordingly, as illustrated in FIG. 2, each new group of objects is displayed in a new pie menu 13 shifted compared to the previous pie menus 11.

Consequently pie menus, which are intuitive and easy to use, answer the two concerns of screen encumbrance and great mouse displacements as long as they do not provide sub-menus. The number of displayed objects may also be a problem.

For this reason, pie menus are not indicated to navigate amongst a great number of related objects with a great number of relations between them.

U.S. Pat. No. 5,689,667 discloses a menu system combining a radial marking menu portion with a linear menu portion displayed simultaneously to try to correct the above mentioned gap of pie menus.

The linear portion of the menu system is displayed only if the menu or submenu to be displayed contains more than eight items. In this case, the eight most used items are displayed in the radial menu portion, the other items being displayed in the linear menu portion.

On another hand U.S. Pat. No. 6,414,700 describes a display comprising menu zones arranged in a pattern where a menu is displayed when a zone is activated. The display also comprises menu bars overlapping the zones where a menu is displayed when a menu item is activated. The menu bars are positioned around a central marking zone and are arranged in a stair step pattern. However the menu bars are used like the menu bars that appear at the top of typical windows type interfaces.

However the problems of screen encumbrance and great mouse displacements to navigate amongst the related objects are not solved by the known solution.

Thus, according to the limitations of the existing solutions shortly discussed above, there is a need for an improved widget of graphical user interface for navigating amongst related objects.

SUMMARY OF THE INVENTION

In one embodiment, the invention therefore provides a widget of graphical user interface for navigating amongst related objects, wherein:
 the widget is adapted for displaying first and second groups of objects within respective first and second visually linked display areas; and
 the widget is further adapted, upon user selection of a relation between at least an object of the second group and at least an object of a third group of objects, for displaying objects of the third group in the second display area and objects of the second group in the first display area.

In other embodiments, the widget of graphical user interface according to the invention may comprise one or more of the following features:
 the widget is further adapted, upon selection of said relation, for replacing:
  objects of the second group by objects of the third group in the second display area; and
  objects of the first group by objects of the second group in the first display area;
 one of the display areas is at least partially nested in the other of the display areas;
 the first and the second display areas are scaled images of each other;
 each of said display areas is at least a portion of a ring;

the widget is further adapted for displaying said objects with different renderings according to their respective display area;

the widget is further adapted, upon user selection of a relation between at least an object of the first group and at least an object of the second group, for restoring initial display of said first and second groups of objects within said respective first and second display areas;

the widget is further adapted, upon user selection of an object of any of said groups, for activating a behaviour associated to said selected object;

the widget is further adapted for displaying a default object of the second group in the first display area;

the widget is further adapted, upon user selection of said relation, for displaying a default object of the third group in place of said default object of the second group;

the widget is further adapted for displaying a default object in only one of the display areas;

each said default objects is an object that is statistically most often selected in its respective group;

the widget is further adapted, upon user pre-selection of said relation, for pre-visualizing objects of said third group in a third display area outside said first and second display areas;

said first, second and third display areas are at least partially nested in each other;

the first display area is at least partially nested in the second display area, which is itself at least partially nested in the third display area; and said objects are hierarchically interrelated.

The invention further proposes a method for navigating amongst related objects, comprising a step of providing to a user a graphical user interface with a widget according to the invention as described here above and displayed in said interface.

According to a further embodiment, the invention proposes a method for navigating amongst related objects, comprising the steps of:

providing to a user a graphical user interface with a widget according to the invention as discussed here above displayed in said interface;

displaying said first and second groups of objects within said respective first and second visually linked display areas;

receiving selection by a user of said relation between said at least one object of the second group and said at least one object of the third group; and displaying objects of the third group in the second display area and objects of the second group in the first display area.

In another embodiment, the invention further proposes a widget of graphical user interface for navigating amongst related objects, wherein:

the widget is adapted for displaying a first group of objects within a respective first display area; and the widget is further adapted, upon user selection of a relation between at least an object of the first group and at least an object of a second group of objects, for displaying objects of the second group in the first display area and objects of the first group in a second display area.

The invention also proposes a method for navigating amongst related objects, comprises the step of providing to a user a graphical user interface with said widget.

According to an embodiment of this method, the method further comprises steps of:

receiving selection by a user of a relation between at least one object of the second group and at least one object of a third group of objects; and displaying objects of the third group in the first display area and objects of the second group in the second display area.

The invention still concerns a computer program comprising code means adapted for implementing any embodiment of the method according to the invention.

The invention finally concerns a computer system comprising means adapted for implementing any embodiment of the method of the invention.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

A system embodying the invention will now be described, by way of non-limiting example, and in reference to the accompanying drawings, where the figures are as follows.

FIGS. 12a-12e are schematic views of another embodiment of the widget according to the invention, illustrating use of said widget.

DETAILED DESCRIPTION OF THE INVENTION

Figure 1:
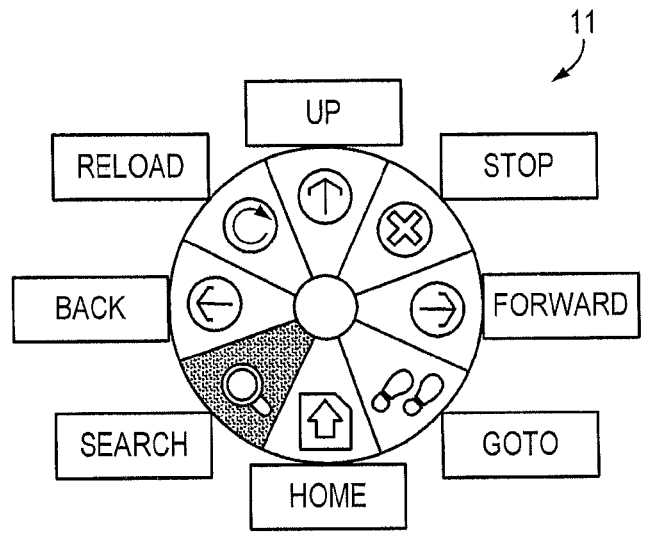
FIGS. 1 and 2 are examples of widgets of GUI for navigating amongst related objects according to the prior art.
Figure 2:
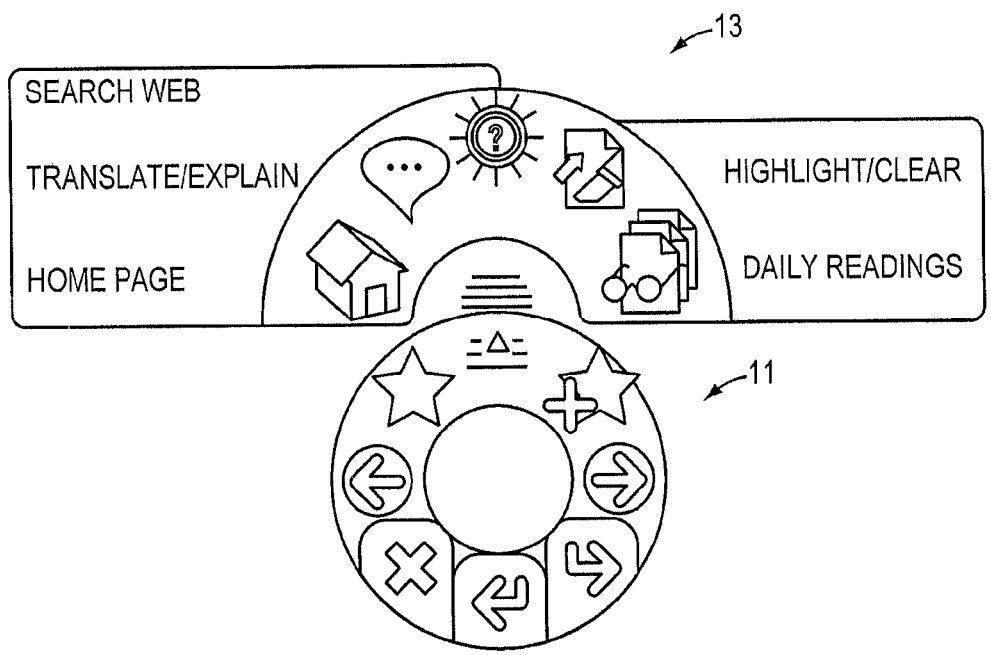

A description of example embodiments of the invention follows.

The teachings of all patents, published applications and references cited herein are incorporated by reference in their entirety.

The invention is directed to a widget for navigating amongst related objects. It should be noted that "navigating" encompasses at least the capabilities to display objects, object groups, links between objects, groups, and objects and groups, to designate or select objects or groups, to activate (that is, execute actions related to) objects via the widget, and other capabilities.

The widget in question is designed for displaying objects of first and second groups within respective display areas which are visually linked. If the user selects a relation between at least an object of the second group and at least an object of a third group of objects, then the display "switches" so that objects of the third group are displayed in the second display area and objects of the second group are displayed in the first display area. As areas are visually linked (e.g. nested in each other), a visual link or cue between groups remains displayed to the user all along the navigation process, so as to materialize relations between objects displayed in said areas; navigation is thereby facilitated. The relation selected might in fact relate an object of the second group with the third group as a whole, or with a specific object in the third group, etc. depending on the nature of the related objects, that is, on the application contemplated. The relation selected may also link the second group as a whole to the third group (a group per se being an object too). Various types of relations may accordingly be contemplated. Incidentally, while objects displayed in display areas might in fact be identifiers of objects (e.g. tags or icons), the relations evoked may actually involve identified objects (e.g. modelled 3D objects as stored on a database) instead of said identifiers. However, this distinction shall not necessarily be emphasized in the following, for the sake of simplicity. Therefore, one may for example hereafter refer to displaying icons and selecting relations between said icons, it being understood that the relations in question may actually involve objects represented by said icons. Similarly, identifiers, such as visual cues, are displayed to the user to represent available relations, possibly in due time, for example when passing the mouse pointer over an icon/object.

According to an embodiment, objects of the third group replace objects of the second group in the second area, which themselves replace objects in the first area (possibly of said objects), so that overall size of the widget remains under control, if not fixed, whereby screen space congestion is prevented. In a variant, pre-visualizing objects of the third group outside said areas helps the user in deciding before actual selection and, thus, before effective replacement. This prevents the user from loosing the thread of navigation too early.

In another embodiment, the widget is adapted for displaying a first group of objects within a respective first display area and, upon user selection of a relation between at least an object of the first group and at least an object of a second group of objects, for displaying objects of the second group in the first display area and objects of the first group in a second display area. Here, only one area is typically displayed before selection of the relation. After selection thereof, the display of groups is switched so that, in practice, the group currently selected is displayed in the vicinity of the location where selection by the user occurred. As in the first embodiment, mouse displacement is reduced and ergonomics are improved.

Typically, said objects are hierarchically interrelated. But more generally, objects and/or groups may be related through any kind of relations, e.g. according to a graph representing the objects/relations structure. For example, if the selected relation relates an object with another object or a group, it is searched to which group said objects belong. This may be achieved for example by traversing a graph from the nodes (representing said objects) along the edge that represents a relation "belongs to group". The opposite node of the traversed edge is then the group to which said objects belong. Subsequently edges defining "comprising object" must be traversed from the group found. Accordingly the objects of the group may be found and then displayed in the second display area.

Figure 3:
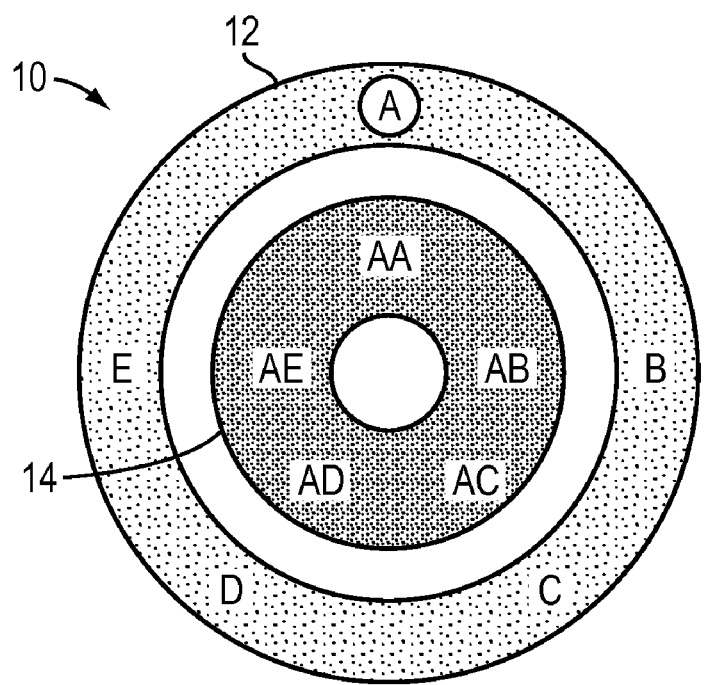
FIGS. 3 to 8 are schematic views of a non-limiting example widget according to an embodiment of the invention.

More in details and in reference to FIG. 3, a widget 10 is displayed in a graphical user interface (GUI). As seen, the widget 10 is designed for displaying first and second groups of objects, within respective first and second display areas 12, 14.

For the sake of clarity, objects depicted are denoted by A, B, C, D and E (for the first group of objects) and by AA, AB, AC, AD and AE (second group). According to the illustrated embodiment, the groups of objects are hierarchically interrelated: here the second group is a subgroup of the first group. Accordingly, AA, AB, etc. can be seen as "child nodes" of objects A, B, etc. Obviously, the widget of the invention may be applied for navigation amongst objects interrelated by any kind of relations, not only by hierarchical relations.

The objects in question may be identified by icons, labels or any other identifiers. The objects may further be related to files, groups of files, commands, groups of commands, programs or group of programs, as well as any object (including object in the sense of object-oriented programming) implemented in a file system or a database or interrelated through any graph.

According to the invention, the first and second display areas 12, 14 are visually linked, so as to better comprehend the relations involved. There are many ways of designing convenient visual links. For example, one of the display areas may be nested or at least partially nested in the other of the display areas. In addition or in alternative, the first and the second display areas 12, 14 may be scaled images of each other.

Other types of visual links between said display areas 12, 14 may obviously be contemplated, such as a visual cue (e.g. an arrow starting from one of the display areas and pointing in the direction of the other display area). Both areas 12, 14 may be adjacent or close to each other. The link may also be a line joining both display areas 12, 14. This link may still be a triangle whose base is adjacent or close to one display area and which points in direction of the other display area. Yet, nested or scaled areas are preferred inasmuch as they provide a better compactness.

In the example of FIG. 3, both display areas 12, 14 are nested in each other. Preferably, the first and second display areas are ring shaped and concentrically arranged, whereby the first and second display areas 12, 14 are scaled images of each other. Such a design is markedly compact.

Obviously, the shape of the display areas is not limited to the illustrated examples, that is, a number of convenient shapes may be contemplated. For example, the display areas 12, 14 may be shaped as ring portions. This turns particularly advantageous as the widget 10 may then be displayed on an edge or on a corner of the screen, for example. In this case, encumbrance of the widget is reduced and the widget is very compact. Yet, the shape of the display areas 12, 14 may be chosen according to a number of objects to be displayed and/or an allowed encumbrance of the widget 10.

In some cases ring shaped display areas are advantageous owing to their compactness. One can yet contemplate rectangular display areas (like in a bar menu), which allows for displaying a number of objects (sometimes more than in a ring shaped display area) and for ordering, whereby said objects are easier to find.

As mentioned, the visual link between the first and second display areas 12, 14 helps the user in navigating amongst related objects: it materializes the link between the two groups of objects displayed in the two display areas 12, 14. Thanks to this visual link between both display areas 12, 14, the navigation amongst objects using the widget according to the invention is much more intuitive for the user.

In FIG. 3, object A is represented circled as a result of activation thereof. The second group of objects AA, AB, etc. is related to object A of the first group. Thus, according to the illustrated example, the second group is a subgroup of the first group of objects which is related to the object A.

Starting from the widget 10 as illustrated in FIG. 3, the user may select a relation between object AB of the second group and a third group of objects. Selection of this relation is depicted on FIG. 4 by the visual cue 16, which in this case is a triangle pointing inward.

Many other solutions may be contemplated as to practical selection of this relation. According to one solution, the user clicks on (selects) the object AB or a portion of the display area 14 around the object AB: then the user is provided with convenient menu or icons allowing for said selection. Another solution consists in passing the mouse (cursor) over the object AB or a dedicated portion in the display area 14 so that a visual cue 16 is displayed. Clicking on (selecting) said cue 16 may then result in selecting said relation. As another possibility, the user may simply double-click an object, whereby a default relation, such as the "is composed of" relation is selected.

Figure 5:
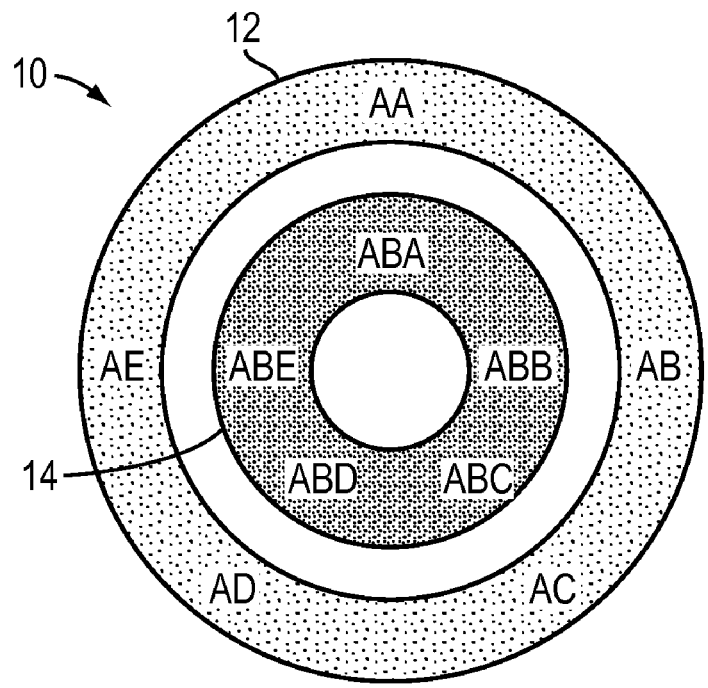

Upon user selection of the relation, the display in the widget 10 is modified, as illustrated in FIG. 5: the second group of objects is displayed in the first display area 12, whereas objects ABA, ABB, ABC, ABD, and ABE of the third group of objects are displayed in the second display area 14.

In other words: the widget 10 is adapted, upon user selection of the relation between an object AB (of the second group) and a third group of objects, for displaying objects ABA, ABB, ABC, ABD, ABE of the third group in the second display area 14 and objects of the second group AA, AB, AC, AD, AE in the first display area 12.

As already discussed here above, overall size of the widget 10 remains under control according to the invention and screen space congestion is prevented. Indeed, the size of the widget 10 is here determined by two levels of display areas 12, 14. Meanwhile, navigation amongst a number (possibly infinite) of interrelated objects (or levels and sublevels) is enabled. Note that the size of the widget 10 may be "hard coded" during the application development itself, possibly depending on the number of objects in each group. In other words, the size of the widget 10 might depend indirectly on the structure and size of the graph or tree relating all objects). Said size may also be dynamically determined during the navigation according to various algorithms or rules.

In the embodiments discussed above, all the objects ABA, ABB, ABC, ABD, and ABE of the third group of objects are displayed in the second display area 14. Yet, there are situations wherein not all the objects can be displayed, due to the number of objects with respect to available space.

Accordingly, various solutions can be contemplated. For example, the n first objects of a group (or the statistically most often selected ones) are displayed within a respective area whereas remaining objects remain hidden, for example behind a dedicated icon. Then, double-clicking said icon would for instance display hidden objects within the same display area. Meanwhile, other objects previously displayed would disappear "behind" said icon. In a variant, none of the previously displayed objects disappear but the overall objects are each rescaled, etc.

In a variant, one may contemplate displaying, upon selection of a relation, only a part of the objects of the third group in the second display area 14. For example, only one or, say, a couple of objects of the third group may be displayed, replacing objects of the second group, while other objects of the second group remain displayed in the second area 14. An object of the second group which is replaced in the second display area 14 may be displayed in the first display area 12, for example in replacement of an object of the first group which was previously displayed in the first area 12. These various possible embodiments discussed above implement different options with various advantages. In particular, when objects and groups are hierarchically interrelated, it is advantageous replacing display of all objects of a group with that of all the objects of another group so that each area corresponds to only one level of the hierarchy. Hierarchy is thereby better understood.

Obviously, the above principle of replacement may repeatedly apply upon selection of further relations. Thus, in reference to FIG. 6, wherein second and third groups of objects are displayed in respective first and second areas 12, 14, the user may select a relation—illustrated by the visual cue 20—between an object ABB of the third group and a fourth group of objects, and so on. In this case, objects of the fourth group are displayed in the second display area 14, while objects of the third group are displayed in the first display area 12.

Figure 4:
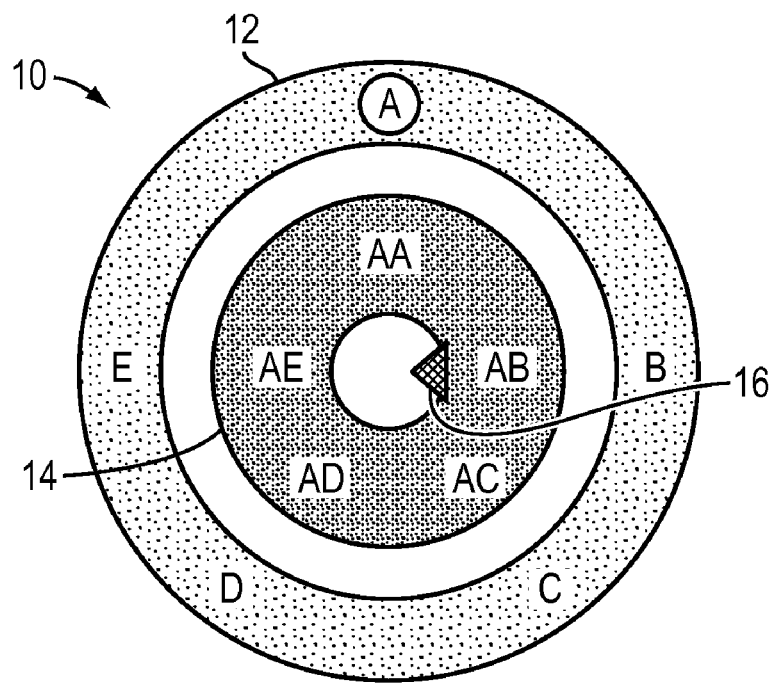
Figure 6:
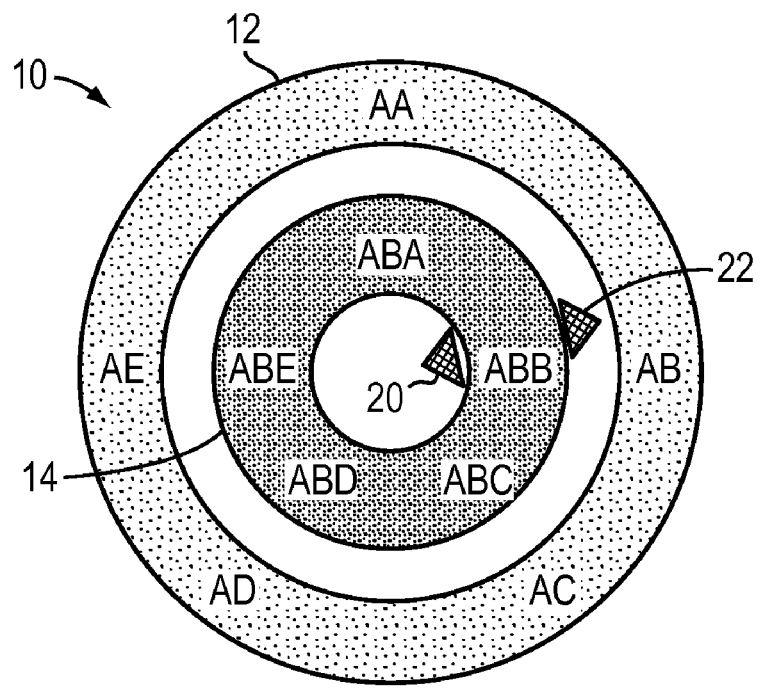

Yet, still in reference to FIG. 6, the user may select a relation—illustrated by the visual cue 22—between an object ABB of the third group and the second group (for example the relation inverse of that previously selected in FIG. 4). In this case, the initial configuration of the widget 10 is restored, as illustrated in FIG. 3, e.g. the objects of the second group are displayed in the second display area 14 and the objects of the first group are displayed in the first display area 12.

In the present case, all the objects of the third group are related to the second group through a same relation. Therefore, objects of the third group may each be associated with a visual cue allowing for restoring the initial configuration as shown in FIG. 3. Yet, only one visual cue can be contemplated in another embodiment.

In other words, the widget 10 is adapted for restoring the initial display of the first and second groups of objects within respective first and second display areas 12, 14—as shown in FIG. 3—upon user selection of a relation to the second group. Accordingly, navigation amongst the groups of objects is made easier. In particular, the user may easily come back to a previous step of navigation. This is particularly advantageous when the groups of objects are hierarchically interrelated, since the widget allows for accessing to the "parent" level of the "current" level.

Moreover, referring to FIG. 3, upon selection of a relation between object AE in the second group and a command, the widget 10 may further be designed, for triggering said command. More generally, the widget 10 may further be adapted, upon user selection of an object of any group, for activating a behaviour associated to said selected object. Consequently, the widget 10 according to the illustrated embodiment allows the users to have "point-and-click" access to specific functions.

In particular, an object displayed in a display area may be related with one or more groups of objects (e.g. "parent" and "child" levels of the "current" level) and a command, each selectable via the widget 10. For example, as illustrated in FIG. 6, an object displayed in the second display area 14 may be associated with two visual cues 20, 22, respectively pointing at inner and outer directions. The third relation with a command may be selected by clicking on the object displayed or on a dedicated portion of the display area 12, 14.

Figure 7:
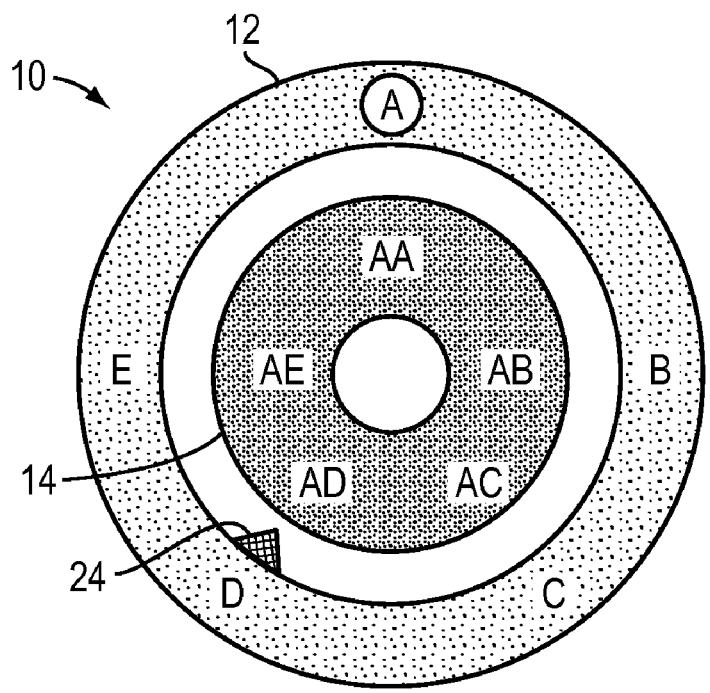
Figure 8:
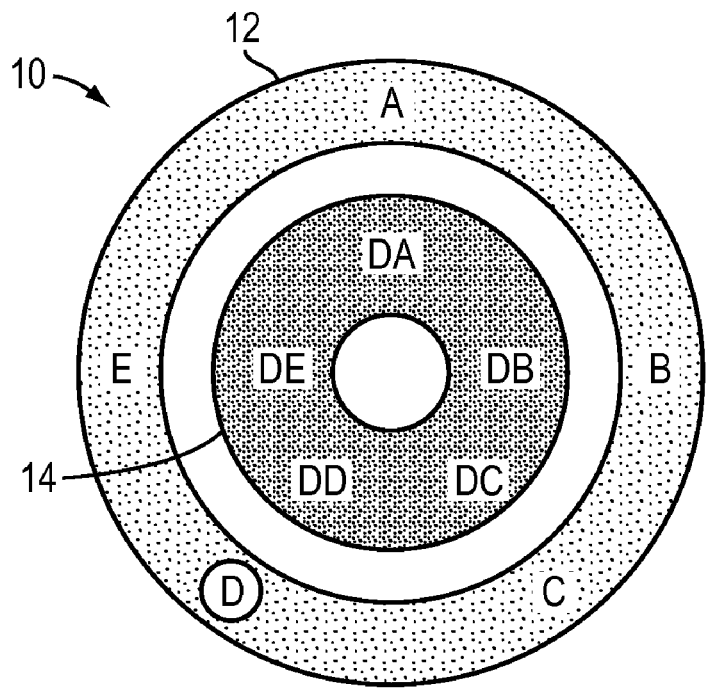

Next, in reference to FIGS. 7 and 8: the first and second groups are respectively displayed in the first and second display areas 12, 14.

According to the illustrated embodiment, the widget 10 may further be adapted for displaying in the second display area 14 a further group (say, the fifth group) of objects DA, DB, DC, DD, DE (FIG. 8) upon selection of a relation (represented by the visual cue 24) between an object D of the first group and the fifth group of objects. According to the illustrated embodiment, objects of the fifth group are displayed in the second display area 14, possibly replacing objects of the second group previously displayed there as shown from FIG. 7 to FIG. 8. As shown in FIG. 8, the object D is circled in this case, meaning that object D is activated, as already discussed.

For example, when the groups of objects are hierarchically interrelated, this makes it possible to access "brother" groups (e.g. having a same parent group), contrary to classical drop-down menus.

As already mentioned, all objects displayed in a given area are preferably replaced, according to the invention, so that all the objects displayed in said area belong to the same group of objects. This is particularly advantageous when objects are hierarchically interrelated as the widget 10 allows for graphically materializing the hierarchical relations involved. This, in turn, helps the user in navigating amongst groups and subgroups of objects. For example, in the illustrated example, the second group (displayed in area 14, FIG. 7) is a subgroup of the first group (displayed in area 12, FIGS. 7 and 8), and the fifth group (displayed in area 14, FIG. 8) is a subgroup of the first group. Thus, the second group and the fifth group are "brother" groups and the widget 10 employs the same display area 14 when displaying (and effecting user navigation among) groups of a same hierarchy level.

Figure 9:
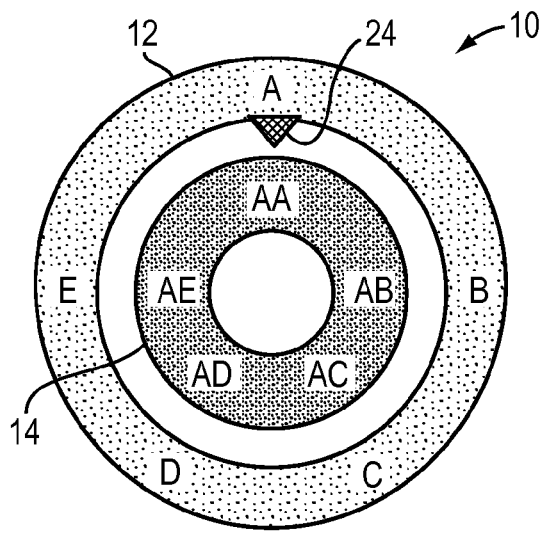
FIGS. 9 to 11 are schematic views of two other example embodiments of the widget of the invention.

Referring now to FIG. 9: object A of the first group of objects (area 12) is related to the second group of objects (area 14) AA, AB, AC, AD, and AE, as depicted by the visual cue 24.

Figure 10:
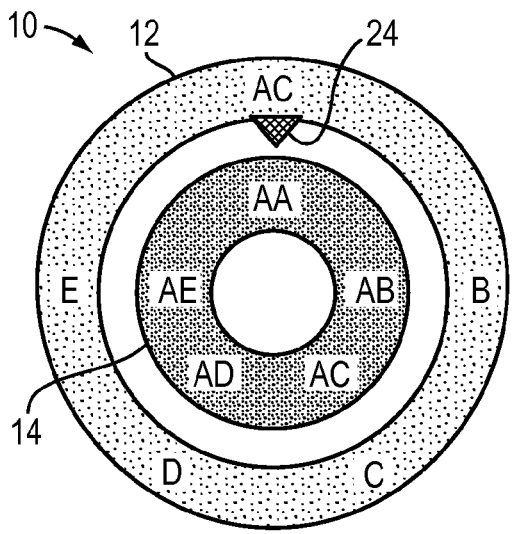
Figure 11:
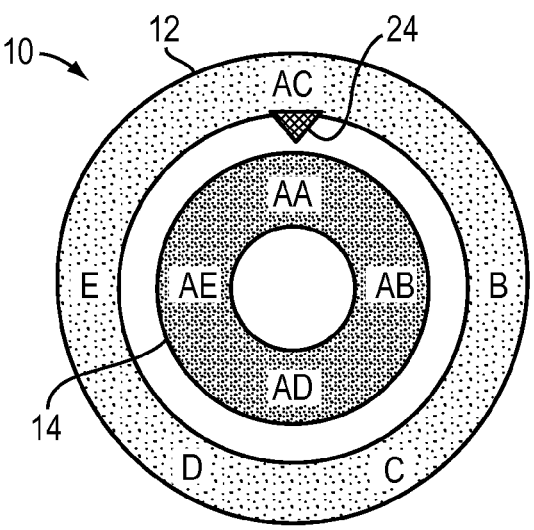

According to embodiments illustrated in FIGS. 9-11: instead of displaying object A in the first area 12, the widget 10 may display there a preferred or default object AC of the second group as shown in FIGS. 10 and 11. In this respect, in the variant of FIG. 10, object AC is displayed in both the first and second display areas 12, 14, whereas object AC is displayed only in the first display area 12 of the widget 10, in the variant of FIG. 11.

However, in both cases, a visual cue 24 illustrates the relation between the object A and the second group of objects.

In other words, the widget 10, as illustrated in FIGS. 10 and 11, is adapted for displaying a "default" or "preferred" object of the second group in the first display area 12. One may provide that options relating to said "default" or "preferred" object are user-editable. Displaying default objects allows in practice for saving time during navigation. In this respect, the default object in question may be an object that is statistically most often selected in its respective group.

Similarly, the widget 10 may further be designed for displaying a default object of the third group in place of said default object of the second group, after selection of a relation to the third group and subsequent display of objects thereof in the second display area 14. In other words, the widget 10 can be adapted for displaying a default object of a group of a given level (n+1) in the display area of a group of level (n). In variants: default objects of groups of given levels (n+1) and (n+2) are displayed in respective display area of group levels (n) and (n+1). It can be pointed out that indexes n, and n+1, etc. do not necessarily mean groups which are contiguous according e.g. to an underlying graph, but which are contiguous according to user navigation. Accordingly, from a general standpoint one or several objects of a group of given level (p) are displayed in the display area of a group of given level (n). Yet, only one default object can be foreseen in only one of the display areas, preferably in the area where the parent level is displayed. Such features can make the widget 10 still more efficient in practice. However, details of implementation shall obviously vary according to applications contemplated.

One skilled in the art will notice that the feature of preferred command or default object may be implemented in any kind of widget of graphical user interface for navigating amongst objects, even in a classical bar menu system or in a radial or pie menu.

Referring now to FIGS. 12a-12e, another embodiment of the invention is now described.

In FIG. 12a is shown a widget 10 displaying an icon 26 corresponding to a "snapshot" command (the icon represents a camera). A first visual cue 28 (optionally displayed with low light rendering) indicates to the user a relation between "snapshot" command (or icon 26) and a first group of objects.

In FIG. 12b, the visual cue rendering is modified since the user has selected the above relation.

Consequently, the first group comprising four icons 30, 32, 34, 36 is displayed in a first display area 122 as illustrated in FIG. 12c, each related to a specific command. In the illustrated example, icons 30, 32, 34 and 36 respectively relate to commands of so-called "copy", "freehand brush", "co-review" and "send to user" (for non-limiting example), the meaning of which is not important for the understanding of the invention. In this example, bars 38, 40 visually link the first display area 122 to icon 26.

In FIG. 12c, a second visual cue 42 appears (the first visual cue 28 is toggled), which is associated with icon 26. The visual cue 42, which is symmetric to the first visual cue 28, denotes a relation similar, yet opposite in direction, to that depicted by former visual cue 28. Activating visual cue 42 may therefore restore initial display.

A third visual cue 44 is displayed which indicates to the user a relation between icon 32 (of the first group) and a second group of objects. As mentioned above, the third visual cue 44 may be displayed with different rendering.

Referring now to FIG. 12d: starting from previous state of FIG. 12c, the user may further select a relation between icon 32 and a second group of objects. In this embodiment, selection gives rise to displaying a second display area 144, e.g. using a different rendering. In the example of FIG. 12d, the first group of objects 30-36 is switched, i.e. displayed in the second display area 144, while objects 50, 52, 54, 56 of the second group are displayed in the first display area 122, so as to provide visual persistence (or "after glow") of the former group (the first one). This prevents from loosing the thread during navigation.

Visual cue 44 is accordingly toggled to visual cue 48, thereby indicating to the user that the second group displayed is related to icon 32. In the illustrated example, visual cue 48 indicates that the second group of icons 50, 52, 54, 56 is a child of icon 32.

In other words, the widget 10 according to the invention may further be adapted, for displaying a first group within a respective first area 122 and, upon user selection of a relation linking first and second groups, for displaying objects of the second group in the first display area 122 and objects of the first group in a second display area 144.

In this embodiment, only one area 122 is displayed before selection of said relation. After selection, the display of groups is switched so that the group currently selected (via the relation) remains substantially displayed in the same location (display area), that is, in the vicinity of the location where selection by the user took place. As in previous embodiments, mouse displacement is accordingly reduced. Ergonomics are therefore improved.

Incidentally, the user may for example select the relation in question by passing over the object (e.g. icon 32) and then select the relation by clicking on the object (icon 32).

As represented in FIG. 12d, icon 32 denotes in fact a preferred or default object of the first group of objects, as already discussed.

Referring now to FIG. 12e: the selection described above (of the second group) may, in a variant, be a pre-selection only, whereby the second area 144 may possibly be displayed only temporarily, e.g. if the user decides not to maintain current selection of the second group. On the contrary, if the user decides to maintain selection of the relation between icon 32 and the second group of objects (icons 50, 52, 54, 56), rendering of the visual cue 48 may then be modified as illustrated in FIG. 12e to indicate to the user that the relation is effectively selected. Then, icons 50, 52, 54, 56 of the second group are maintained in the first display area 122.

At present, the new state is the following: objects of the second group are displayed in the first area 122 while objects of the first group have been pushed to the second display area 144. Next, in subsequent steps, upon user selection of a relation between at least one object of the second group and at least one object of a third group of objects, the widget 10 may display objects of the third group in the first display area 122, pushing objects of the second group to the second display area 144.

Importantly, we note however that the above new state could be depicted as reflecting objects of the first group displayed in a given first area (renaming the former "second area" as new "first area") while objects of the second group are in a given second area (here above called first area). Accordingly, the subsequent steps discussed above (i.e. displaying the third group in the first area 122 while pushing second group to the second area 144) are just the same as those discussed in reference to FIGS. 3-5. According to a further interpretation, one may understand that the embodiment of FIG. 12c-d corresponds to that of FIG. 3-11, except that only one display area is initially displayed and, upon displaying the second group, that the first display area is moved outwardly (e.g. displayed outside the second area). Therefore, one understands that variants described in reference to FIGS. 3-11 may also apply to the embodiment of FIGS. 12a-e. In both types of embodiments, the solution provided allows for reducing mouse displacements and, more generally, for improving ergonomics.

Next, in other embodiments, three levels of display area can be provided. In this case, the widget 10 of the invention may preferably be displayed in such a way that the first, second and third display areas are at least partially nested in each other. For example, the first display area may be at least partially nested in the second display area, which may itself at least be partially nested in the third display area. Obviously, according to another embodiment, the third display area may be at least partially nested in the second display area, which may itself at least be partially nested in the first display area.

Displaying the third group of objects upon pre-selection of a relation between an object of the second group and the third group may be advantageous for a user looking for one precise object. He/she may indeed look quickly in all the groups related to a single object without modifying the whole display of the widget according to the invention.

Incidentally, because the third group is only temporarily displayed upon pre-selection, encumbrance of the screen still remains under control.

Referring back to FIGS. 12d-12e, the widget 10 according to the invention may further be adapted for displaying the objects with different renderings according to their respective display area 122, 144. This can help to distinguish between the two display areas. Moreover, different renderings of each display area may help the user in distinguishing between the different groups of objects displayed therein. Again, this is particularly advantageous when the groups of objects are hierarchically interrelated, the different levels of groups then being more easily distinguished (readily visually distinguished) from each other.

As exemplified above, the widget 10 according to the invention makes it possible to navigate amongst related objects, according to the method described. It is to be understood that the foregoing method can be applied to various kinds of objects in any configuration capable of being defined by a computer system. Furthermore, the present invention will advantageously reflect in a computer program comprising code means for implementing said widget and method. Similarly, it will preferably be implemented in a convenient computer system.

In this respect, the invention may be implemented in digital electronic circuitry, or in computer hardware, firmware, software, or in combinations of them. Apparatus of the invention may be implemented in a computer program product tangibly embodied in a machine-readable storage device for execution by a programmable processor, and method steps of the invention may be performed by a programmable processor executing a program of instructions to perform functions of the invention by operating on input data and generating output.

Figure 13A:
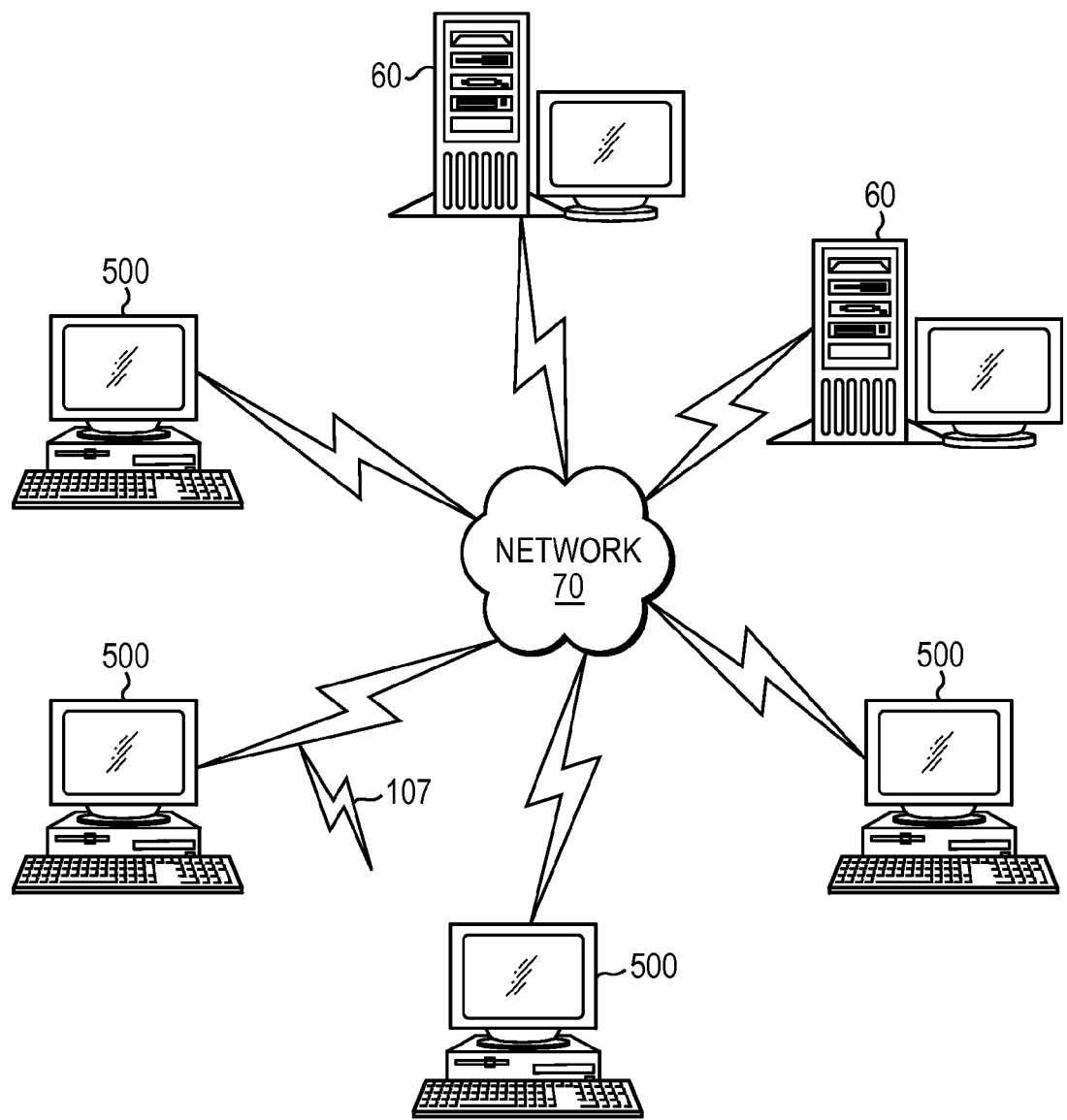
FIGS. 13a and 13b are schematic and block diagrams of a computer network and the computer nodes therein in which embodiments of the present invention operate.

FIG. 13a illustrates a computer network or similar digital processing environment in which the present invention may be implemented.

Client computer(s)/devices 500 and server computer(s) 60 provide processing, storage, and input/output devices executing application programs and the like. Client computer(s)/devices 500 can also be linked through communications network 70 to other computing devices, including other client devices/processes 500 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 13B:
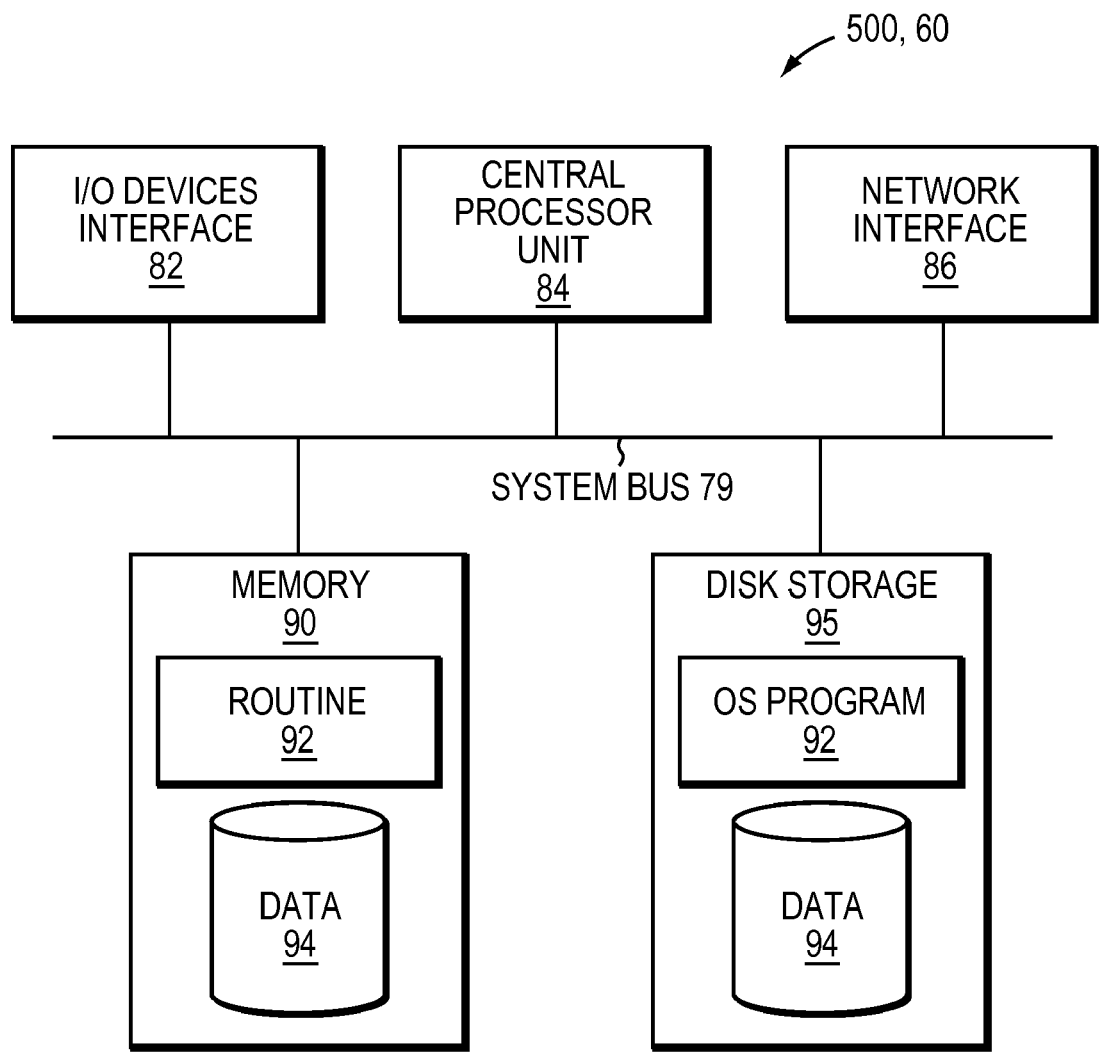

FIG. 13b is a diagram of the internal structure of a computer (e.g., client processor/device 500 or server computers 60) in the computer system of FIG. 13a. Each computer 500, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 500, 60. Network interface 86 allows the computer to connect to various other devices attached to a network (e.g., network 70 of FIG. 13a). Memory 90 provides volatile storage for computer software instructions 92 and data 94 used to implement an embodiment of the present invention (e.g., widget 10 and graphical user interface code thereof detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network (s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 500 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

Preferred embodiments of the present invention have been described. It will be understood that various modifications may be made without departing from the spirit and scope of the invention. Therefore, other implementations are within the scope of the following claims.

For instance, smooth animated transitions make it easier to understand the principle. These animations may be carried out in 2D (such as implement in standard head-up-display paradigms) or in 3D (for example to provide a more intuitive feeling of the menu behaviour). Similarly, it may be possible to show temporarily three rings or display areas, one or two being possibly semi-transparent to improve the usability (better understanding of the upper and lower levels) or to provide acceleration by making it possible to directly access another (parallel) sub-level menu without having to go back to the parent menu).

On another hand, any menu may contain any number of items, knowing that the more items, the larger the menus. With common resolution screens and icon sizes, using more than eight objects per ring or display should be avoided to have a good compromise between size and legibility.

A specific case may be when the first or main menu contains one and only one item: in this case, displaying a ring is not necessary.

Moreover, one could notice that any command may be chosen as "default object" displayed in a display area, even from a non-directly related object. This would make it possible to quickly access commands.

Furthermore, it should be noted that the navigation principle may work in one way or the other, displaying e.g. the parent menu either inside or outside the child-menu. Thus, behaviours described above would actually work if navigation direction is inverted (e.g. outwardly instead of inwardly). For instance, navigating outwardly may turn more convenient when using pre-visualization. Indeed, space needs in this case be only temporarily provided outside the widget. In contrast, navigating inwardly would actually require providing space inside the widget for enabling pre-visualization features.

In this respect, an implementation with parent area inside the child area may be more intuitive though, even if the opposite implementation could also work without any limitation. In all the cases, the use of the navigation widget according to the invention makes it easier for the end-user to navigate between menus or interrelated objects.

Next, it is pointed out that a two-level implementation of display areas may actually be reduced to one level only. In this case, the widget would be designed for displaying a first group of objects within a respective area. Then, upon user selection of a relation between an object of the first group and a second group of objects, objects of the second group would be displayed in said area, while objects of the first group would disappear. Yet, visual cues could be provided for indicating a current direction (or sequence) of navigation among and/or between the groups of objects. Selection of said visual cues may possibly enable further navigation amongst interrelated groups/objects. However, such an implementation makes it harder for the user to keep in mind previous navigation steps and/or relations involving objects currently displayed.

Finally; one may keep in mind that the present invention may be used for displaying and navigating between (usually hierarchical) menus (that is, list and sub-lists of commands), but is obviously not limited to do so, and may be used for many various purposes and in many various contexts, not necessarily linked to CAD/CAM/CAE/PDM/VPLM, Data and Knowledge Management, VideoGames, or 3D Interactive Experience industry.

While this invention has been particularly shown and described with references to example embodiments thereof, it will be understood by those skilled in the art that various changes in form and details may be made therein without departing from the scope of the invention encompassed by the appended claims.

What is claimed is:

1. A computer apparatus for navigating amongst related objects, comprising:
    a widget displayed in a graphical a graphical user interface, the widget adapted for displaying first and second groups of objects within respective first and second visually linked display areas; and
    the widget initially displayed in the second group of objects in the second display area, the widget being further adapted, upon user selection of a relation between at least an object of the second group as initially displayed in the second display area and at least an object of a third group of objects, for changing display of objects of the third group to be in the second display area and displaying objects of the second group to be in the first display area, such that displaying the first group of objects in the first display area switches to displaying the second group of objects in the first display area and the initial further displaying of the second group of objects in the second display area switches to displaying the third group of objects in the second display area.

2. The computer apparatus according to claim 1, wherein the widget is further adapted, upon selection of said relation, for replacing:
    objects of the second group by objects of the third group in the second display area; and
    objects of the first group by objects of the second group in the first display area.

3. The computer apparatus according to claim 1, wherein one of the display areas is at least partially nested in the other of the display areas.

4. The computer apparatus according to claim 3, wherein the first and the second display areas are scaled images of each other.

5. The computer apparatus of claim 1, wherein each of said display areas is at least a portion of a ring.

6. The computer apparatus according to claim 1, wherein the widget is further adapted for displaying said objects with different renderings according to their respective display area.

7. The computer apparatus according to claim 1, wherein the widget is further adapted, upon user selection of a relation between at least an object of the first group and at least an object of the second group, for restoring initial display of said first and second groups of objects within said respective first and second display areas.

8. The computer apparatus according to claim 1, wherein the widget is further adapted, upon user selection of an object of any of said groups, for activating a behaviour associated to said selected object.

9. The computer apparatus according to claim 1, wherein the widget is further adapted for displaying a default object of the second group in the first display area responsive to the user selection of the relation between at least an object of the second group and at least an object of a third group of objects.

10. The computer apparatus-according to claim 9, wherein the widget is further adapted, upon user selection of said relation, for displaying a default object of the third group in place of said default object of the second group.

11. The computer apparatus according to claim 9, wherein the widget is further adapted for displaying a default object in only one of the display areas.

12. The computer apparatus according to claim 9, wherein said default object is an object that is statistically most often selected of objects in its respective group.

13. The computer apparatus according to claim 1, wherein the widget is further adapted, responsive to user pre-selection of said relation, for pre-visualizing objects of said third group in a third display area outside said first and second display areas.

14. The computer apparatus according to claim 13, wherein said first, second and third display areas are at least partially nested in each other.

15. The computer apparatus according to claim 14, wherein the first display area is at least partially nested in the second display area, which is itself at least partially nested in the third display area.

16. The computer apparatus according to claim 1, wherein said objects are hierarchically interrelated.

17. A computer apparatus for displaying a widget in a graphical user interface for navigating amongst related objects, wherein:
the widget is adapted for displaying a first group of objects within a respective first display area; and
the widget is further adapted, upon user selection of a relation between at least one of the objects of the first group displayed in the first display area and at least an object of a second group of objects, for displaying objects of the second group in the first display area and displaying objects of the first group, switched from being displayed in the first display area to being displayed in a second display area.

18. A method for navigating amongst related objects in a computer application, comprising:
providing to a user a graphical user interface having a widget, the widget being adapted to display a first group of objects within a respective first display area, and the widget being further adapted, upon user selection of a relation between at least an object of the first group displayed in the first display area and at least an object of a second group of objects, to display objects of the second group in the first display area and to display objects of the first group switched from being displayed in the first display area to being displayed in a second display area; and
displaying the widget in said interface.

19. A method for navigating amongst related objects, comprising computer implemented steps of:
in a graphical user interface:
displaying first and second groups of objects within respective first and second visually linked display areas;
receiving selection by a user of a relation between said at least one object of the second group and at least one object of a third group; and
displaying objects of the third group in the second display area and displaying objects of the second group switched from being displayed in the second display area to being displayed in the first display area.

20. A method for navigating amongst related objects, comprising the computer implemented steps of:
in a user a graphical user interface:
displaying a first group of objects within a respective first display area; and
upon user selection of a relation between at least an object of the first group, displayed on the first display area and at least an object of a second group of objects, displaying objects of the second group in the first display area and display of objects of the first group, switched from being displayed in the first display area to being displayed in a second display area.

21. The method of claim 20, further comprising steps of:
receiving selection by a user of a relation between at least one object of the second group and at least one object of a third group of objects; and
displaying objects of the third group in the first display area and objects of the second group in the second display area.

22. A computer program product comprising:
a computer readable storage medium having computer code embedded thereon, which when executed by a digital processor generates a widget of a graphical user interface for navigating amongst related objects, wherein:
the widget is adapted for displaying a first group of objects within a respective first display area; and
the widget is further adapted, upon user selection of a relation between at least an object of the first group displayed in a first display area and at least an object of a second group of objects, for displaying objects of the second group in the first display area and displaying objects of the first group switched from being displayed in the first display area to being displayed in a second display area.

23. A computer system comprising:
graphical user interface means executed in a processor for: (i) displaying a first group of objects within a respective first display area; and (ii) upon user selection of a relation between at least an object of the first group and at least an object of a second group of objects, displaying objects of the second group in the first display area and displaying objects of the first group switched from being displayed in the first display area to being displayed in a second display area; and
display means responsive to the processor and having a computer screen for outputting to a user a resulting widget of the graphical user interface means.

24. The computer system as claimed in claim 23 further comprising:

means executed in a processor for visually limiting the first and second display areas; and wherein the graphical user interface means further:

receives selection by a user of a relation between at least one object of the second group and at least one object of a third group of objects; and displays objects of the third group in the first display area and objects of the second group in the second display area.

* * * * *